(12) United States Patent
Kanke et al.

(10) Patent No.: US 9,389,375 B2
(45) Date of Patent: Jul. 12, 2016

(54) OPTICAL COUPLING ELEMENT AND OPTICAL MODULE PROVIDED WITH SAME

(71) Applicant: Enplas Corporation, Saitama (JP)

(72) Inventors: Shinya Kanke, Saitama (JP); Shimpei Morioka, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/434,332

(22) PCT Filed: Oct. 9, 2013

(86) PCT No.: PCT/JP2013/006015
§ 371 (c)(1),
(2) Date: Apr. 8, 2015

(87) PCT Pub. No.: WO2014/057666
PCT Pub. Date: Apr. 17, 2014

(65) Prior Publication Data
US 2015/0234135 A1 Aug. 20, 2015

(30) Foreign Application Priority Data
Oct. 10, 2012 (JP) ................. 2012-225197

(51) Int. Cl.
G02B 6/32 (2006.01)
G02B 6/42 (2006.01)
(52) U.S. Cl.
CPC .............. G02B 6/4214 (2013.01); G02B 6/425 (2013.01)
(58) Field of Classification Search
CPC .............................. G02B 6/4214; G02B 6/425
USPC .......................................................... 385/33
See application file for complete search history.

(56) References Cited

U.S. PATENT DOCUMENTS

| 9,134,494 | B2 * | 9/2015 | Wang ........................ G02B 6/32 |
| 9,158,071 | B2 * | 10/2015 | Nishimura ................ G02B 6/32 |
| 9,207,413 | B2 * | 12/2015 | Bylander ............. G02B 6/4249 |
| 2001/0004413 | A1 | 6/2001 | Aihara | |

(Continued)

FOREIGN PATENT DOCUMENTS

| JP | 09-281302 A | 10/1997 |
| JP | 2001-051162 A | 2/2001 |

(Continued)

OTHER PUBLICATIONS

T. Sugiu et al., "Molded glass microlens arary for LD array module", Technical Report of IEICE. OQE93-143, Dec. 17, 1993, pp. 49-54, vol. 93, No. 404, The Institute of Electronics, Information, and Communication Engineers.
International Search Report from International Application No. PCT/JP2013/006015 mailed Nov. 5, 2013.

*Primary Examiner* — Sung Pak
(74) *Attorney, Agent, or Firm* — Brundidge & Stanger, P.C.

(57) ABSTRACT

An optical coupling element of the invention includes: a plurality of incident surfaces having a predetermined curvature, where light emitted from a plurality of light-emitting elements is respectively incident; a reflective surface reflecting the light incident respectively on the incident surfaces and having a predetermined curvature; and a plurality of output surfaces respectively outputting the light reflected by the reflective surface toward an end face of an optical fiber and having a predetermined curvature. The curvatures for the incident surfaces, the reflective surface, and the output surfaces are adjusted such that the X-direction tolerance is greater than the Y-direction tolerance. Here, the alignment direction of the plurality of incident surfaces is the X direction, the advancement direction of the light is the Z direction, and the direction perpendicular to the X and Z directions is the Y direction.

8 Claims, 16 Drawing Sheets

(56) References Cited

U.S. PATENT DOCUMENTS

| | | |
|---|---|---|
| 2011/0064358 A1 | 3/2011 | Nishimura |
| 2013/0266260 A1 | 10/2013 | Morioka et al. |
| 2015/0234135 A1* | 8/2015 | Kanke .................... G02B 6/425 385/33 |

FOREIGN PATENT DOCUMENTS

| | | |
|---|---|---|
| JP | 2001-174671 A | 6/2001 |
| JP | 2004-302459 A | 10/2004 |
| JP | 2011-059484 A | 3/2011 |
| JP | 2012-108443 A | 6/2012 |

\* cited by examiner

OPTICAL COUPLING ELEMENT AND OPTICAL MODULE PROVIDED WITH SAME

TECHNICAL FIELD

The present invention relates to an optical coupling element and an optical module including the same, and in particular to an optical coupling element suitable for optically coupling a plurality of light emitting elements and end surfaces of a plurality of optical fibers, and an optical module including the same.

BACKGROUND ART

Recently, in reflection of the needs for high-speed communication and compact communication devices, there have been increasing demands for a lens array in which a plurality of lenses are disposed, as an optical component that is effective for achieving a multi-channel optical communication in a compact configuration.

Conventionally, an optoelectric converting device including a plurality of light emitting elements (e.g., VCSEL: Vertical Cavity Surface Emitting Laser) and a plurality of optical fibers have been able to be attached to the lens array of this kind.

In addition, the lens array has been capable of performing a multi-channel optical communication by optically coupling light emitted from each light emitting element of the optoelectric converting device to an end surface of each of the plurality of optical fibers in such a state that the lens array is disposed between the optoelectric converting device and the optical fibers.

Further, among the lens arrays of this type, there have been lens arrays including a reflection surface in optical paths of light from light emitting elements, as set forth in PTLS 1 to 3, for example.

CITATION LIST

Patent Literature

PTL 1
Japanese Patent Application Laid-Open No. 2011-59484
PTL 2
Japanese Patent Application Laid-Open No. 2001-51162
PTL 3
Japanese Patent Application Laid-Open No. 9-281302

SUMMARY OF INVENTION

Technical Problem

Incidentally, the lens array has been conventionally formed by an injection molding method with a resin material (e.g., polyetherimide) using a metal mold, as a mainstream method. However, such a lens array has a risk of being deformed (expanded) in association with the temperature change due to heat generation of a laser itself, or with the temperature increase under such an operating environment as in a server where the temperature is easily elevated higher. In addition, such a lens array has a risk of being shrunk at the time of low temperature compared with at the time of ordinary temperature.

Accordingly, the lens array of this kind has been required to maintain optical coupling efficiency between a light emitting element and an end surface of an optical fiber even when deformation occurs, taking account of deformation due to temperature change (thermal deformation).

On the other hand, there has been a problem in which it is difficult to expect the enhancement in manufacturing efficiency and freedom of design, when such maintenance of the optical coupling efficiency taking account of the temperature change depends only on high-precision positioning of the optoelectric converting device using active alignment or the like or on working precision (dimensional precision) of a metal mold.

An object of the present invention is to provide an optical coupling element that can effectively ease the temperature dependency of the optical coupling efficiency while enhancing manufacturing efficiency and freedom of design, and an optical module including the same.

Solution to Problem

The present invention relates to an optical coupling element and an optical module as set forth below.

[1] An optical coupling element configured to be able to optically couple a plurality of light emitting elements and end surfaces of a plurality of optical fibers in such a state as to be disposed between the plurality of light emitting elements and the plurality of optical fibers, the optical coupling element comprising: a plurality of incidence surfaces having a curvature disposed to correspond to each of the plurality of light emitting elements, on a first surface closer to the plurality of light emitting elements, of a optical coupling element main body and allowing each light emitted from the plurality of light emitting elements to enter the plurality of incidence surfaces; a reflection surface having a curvature disposed to have an inclination relative to the first surface, on a second surface opposite to the first surface, of the optical coupling element main body and reflecting each light from the plurality of light emitting elements having entered the plurality of incidence surfaces toward the plurality of optical fibers; and a plurality of emission surfaces having a curvature disposed to correspond to each of the end surfaces of the plurality of optical fibers, on a third surface, closer to the plurality of optical fibers, of the optical coupling element main body and emitting each light from the plurality of light emitting elements having been reflected by the reflection surface toward the end surfaces of the plurality of optical fibers, wherein: in a case where, when the plurality of incidence surfaces are aligned and disposed to form only a single row in an alignment direction of the single row, the alignment direction is defined as "X direction," a traveling direction of the light emitted from the plurality of light emitting elements is defined as "Z direction," and a direction orthogonal to the X and Z directions is defined as "Y direction," and on a supposition that the plurality of light emitting elements are moved from a position at which each optical coupling efficiency between the plurality of light emitting elements and the end surfaces of the plurality of optical fibers demonstrates a preset maximum efficiency to a position at which a predetermined decrease in optical coupling efficiency based on the maximum efficiency is demonstrated, a distance in the X direction between the position before the movement and the position after the movement is defined as "X direction tolerance," and a distance in the Y direction between the position before the movement and the position after the movement is defined as "Y direction tolerance," curvatures of the incidence surface, the reflection surface, and the emission surface are adjusted such that the X direction tolerance is greater than the Y direction tolerance.

[2] The optical coupling element according to [1], wherein, when the plurality of incidence surfaces are disposed in such a state that a plurality of unit rows, in which a predetermined number or more of the incidence surfaces are aligned, are arranged in parallel along a parallel direction orthogonal to an alignment direction of the unit row, a direction having a relatively smaller angle, out of the alignment direction and the parallel direction, relative to a virtual straight line connecting a predetermined reference point of thermal deformation on the first surface of the optical coupling element main body and a center point of the incidence surface that is the most distant from the reference point, is defined as "X direction."

[3] The optical coupling element according to [1] or [2], wherein: the plurality of incidence surfaces are such biconic surfaces being convex toward the light emitting elements as to have different curvatures in the X and Y directions; the reflection surface is such a cylindrical surface being concave with respect to the light emitting elements and the end surfaces of the optical fibers as to have a curvature in YZ cross-section but not to have a curvature in XY and XZ cross-sections; and the plurality of emission surfaces are such cylindrical surfaces being convex toward the end surfaces of the optical fibers as to have a curvature in XZ cross-section but not to have a curvature in XY and YZ cross-sections.

[4] The optical coupling element according to [1] or [2], wherein: the plurality of incidence surfaces are such aspherical surfaces being convex toward the light emitting elements as to have the same curvatures in the X and Y directions; the reflection surface is such a cylindrical surface being concave with respect to the light emitting elements and the end surfaces of the optical fibers as to have a curvature in YZ cross-section but not to have a curvature in XY and XZ cross-sections; and the plurality of emission surfaces are such cylindrical surfaces being convex toward the end surfaces of the optical fibers as to have a curvature in XZ cross-section but not to have a curvature in XY and YZ cross-sections.

[5] The optical coupling element according to any one of [1] to [4], wherein: the Y direction tolerance has an equivalent value to a tolerance in a case of supposing that the plurality of incidence surfaces are such aspherical surfaces being convex toward the light emitting elements as to have the same curvatures in the X and Y directions, supposing that the plurality of emission surfaces are such aspherical surfaces being convex toward the end surfaces of the optical fibers as to have the same curvatures in the X and Y directions, and supposing that the reflection surface is a planar surface; and the curvatures are adjusted in order that the X direction tolerance is greater than the equivalent value of the Y direction tolerance.

[6] The optical coupling element according to any one of [1] to [5], wherein the curvatures are adjusted in order that the X direction tolerance is 1.2 times or more greater than the Y direction tolerance.

[7] The optical coupling element according to any one of [1] to [6], wherein the reflection surface is a total reflection surface that totally reflects each light from the plurality of light emitting elements toward the plurality of emission surfaces.

[8] An optical module comprising: the optical coupling element according to any one of [1] to [7]; and a light emitting element.

Advantageous Effects of Invention

According to the present invention, it is possible to effectively ease the temperature dependency of the optical coupling efficiency while enhancing manufacturing efficiency and freedom of design.

According to the invention of [1], the tolerance in the X direction in which the optical coupling efficiency tends to be influenced by thermal deformation can be greater than the tolerance in the Y direction by adjusting the curvatures of the incidence surface, reflection surface and emission surface. Therefore, the positional precision required for the light emitting element can be eased, so that it becomes possible to effectively ease the temperature dependency of the optical coupling efficiency while enhancing manufacturing efficiency and freedom of design.

According to the invention of [2], even when a plurality of rows of incidence surfaces are disposed in parallel, it becomes possible to increase the tolerance in a direction in which thermal deformation tends to have an influence the most (X direction). Therefore, it is possible to flexibly cope with various modes in which light emitting elements are disposed.

According to the invention of [3], the tolerance can be effectively improved.

According to the invention of [4], the tolerance can be surely improved.

According to the invention of [5], the X direction tolerance can be positively enhanced more than before. Therefore, the positional precision required for the light emitting element can be effectively eased further.

According to the invention of [6], the X direction tolerance can be sufficiently enhanced.

According to the invention of [7], the reflection surface can be formed only of the surface shape of the optical coupling element main body. Therefore, it becomes possible to further enhance manufacturing efficiency as a result of the reduction in the number of components and manufacturing processes.

According to the invention of [8], it becomes possible to ease the temperature dependency of the optical coupling efficiency, with enhanced manufacturing efficiency and freedom of design.

DESCRIPTION OF EMBODIMENTS

In the following, embodiments of the present invention will be described in detail with reference to drawings.

Embodiment 1

Figure 1:
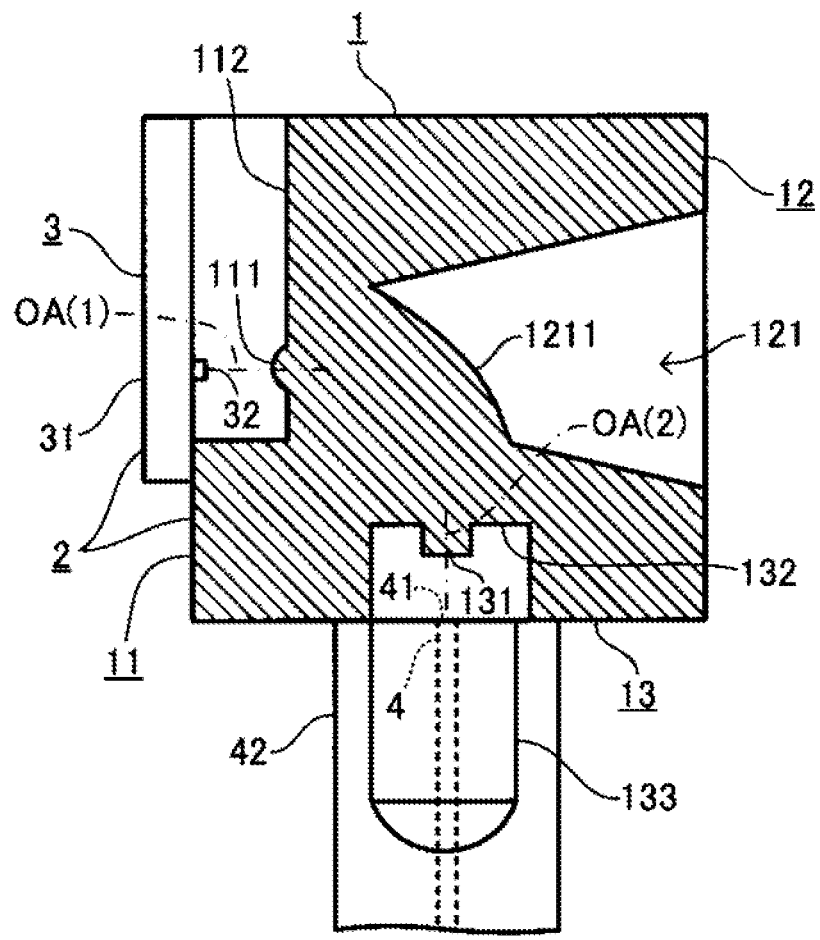
FIG. 1 is a drawing illustrating a configuration of a lens array as an optical coupling element and an optical module according to Embodiment 1.
Figure 2:
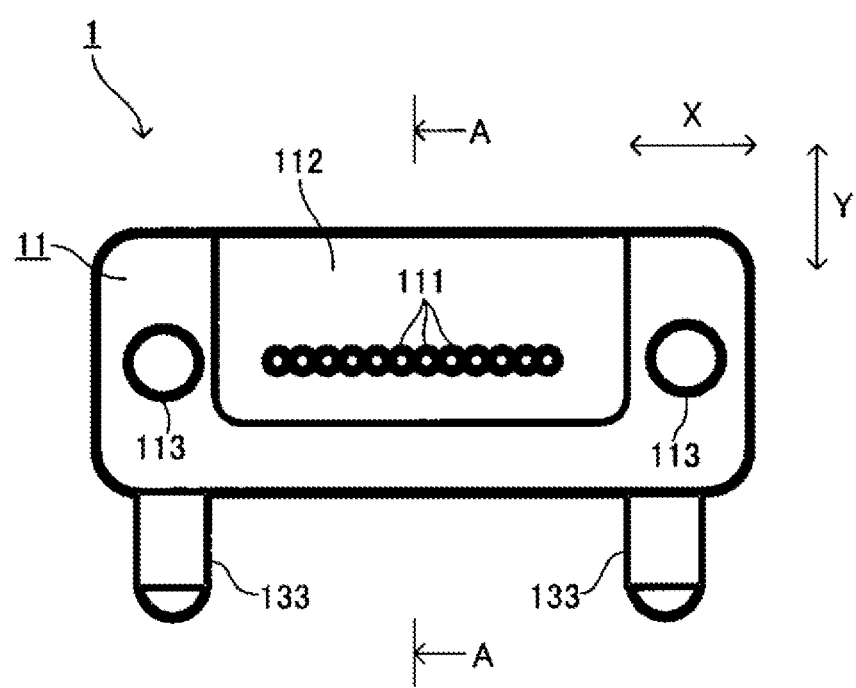
FIG. 2 is a front view of the lens array.
Figure 3:
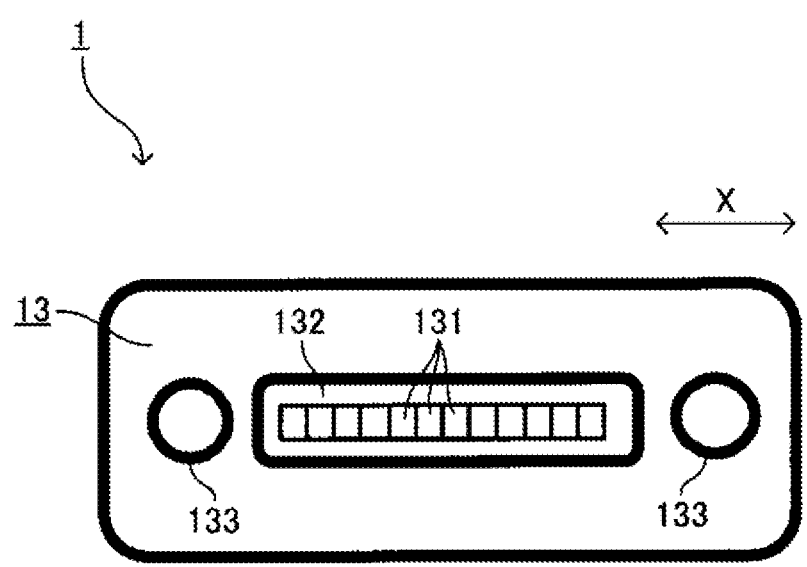
FIG. 3 is a bottom view of the lens array.
Figure 4:
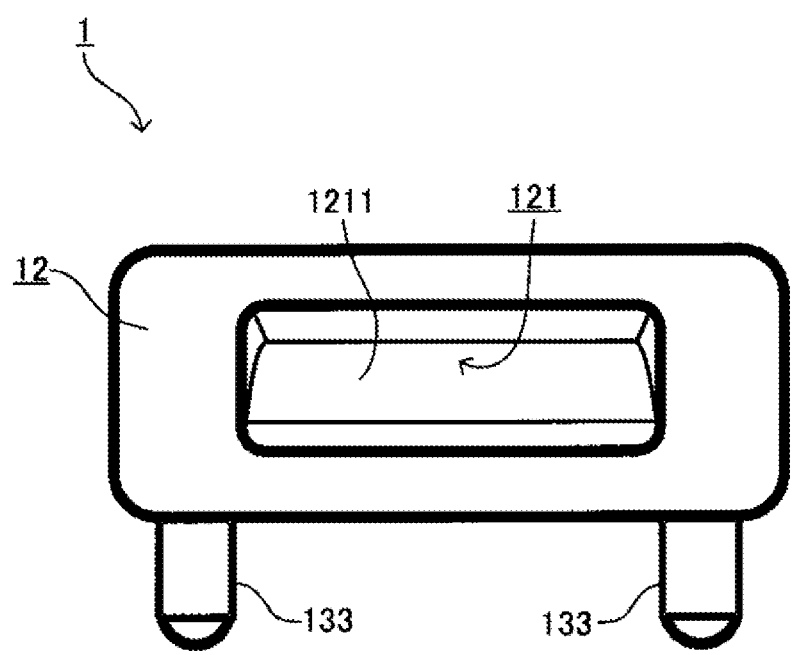
FIG. 4 is a rear view of the lens array.

FIG. 1 is a longitudinal sectional view (sectional view taken along line A-A in FIG. 2) of lens array (lens array main body) 1 as an optical coupling element according to Embodiment 1. FIG. 1 also illustrates the outline of optical module 2 including lens array 1. FIG. 2 is a front view of lens array 1 illustrated in FIG. 1. FIG. 3 is a bottom view of lens array 1 illustrated in FIG. 1. FIG. 4 is a rear view of lens array 1 illustrated in FIG. 1.

As illustrated in FIG. 1, lens array 1 is disposed between optoelectric converting device 3 and optical fiber 4. Lens array 1 optically couples light emitting element 32 to end surface 41 of optical fiber 4. Lens array 1 is integrally formed of an optically transparent resin material (e.g., polyetherimide). Lens array 1 may be formed by injection molding method, for example.

(Configuration of Light Emitting Element)

Optoelectric converting device 3 has a plurality of light emitting elements 32. Light emitting element 32 emits (irradiates) laser light L (see FIG. 5A) in the vertical direction (rightward direction in FIG. 1) relative to a surface, that faces lens array 1, of semiconductor substrate 31. Light emitting element 32 composes Vertical Cavity Surface Emitting Laser (VCSEL). It is noted that a plurality of light emitting elements 32 are disposed in the vertical direction to the sheet of FIG. 1. Optoelectric converting device 3 is disposed to face lens array 1, for example, such that a surface, closer to lens array 1, of semiconductor substrate 31 abuts lens array 1. In addition, optoelectric converting device 3 is attached to lens array 1 by a known fixing means.

(Configuration of Optical Fiber)

Optical fiber 4 is disposed in the same direction as a direction in which the respective light emitting elements 32 are aligned (vertical direction to the sheet of FIG. 1). The number of optical fibers 4 is the same as that of light emitting elements 32. A plurality of optical fibers 4 are aligned at the same pitches as those of a plurality of light emitting elements 32. Optical fiber 4 is attached to lens array 1 by a known fixing means in such a state that a portion closer to end surface 41 is held inside multicore package type connector 42.

It is noted that optical fiber 4 may either be a multi-mode fiber, or a single-mode fiber.

As illustrated in FIGS. 1 and 2, lens array 1 includes a plurality of first lens surfaces 111 (incidence surfaces), total reflection surface 1211 (reflection surface), and a plurality of second lens surfaces 131.

(Configuration of Incidence Surface)

First lens surface 111 is disposed on front end surface 11 (first surface) to which optoelectric converting device 3 (light emitting element 32) is to be attached. In the present embodiment, the number of first lens surfaces 111 is twelve which is the same number as that of light emitting elements 32. As illustrated in FIG. 1, area 112, on which each first lens surface 111 is formed, (hereinafter, referred to as first lens formation area) of front end surface 11 is a recessed inner surface formed closer to total reflection surface 1211 than an area, other than first lens formation area 112, of front end surface 11. In addition, first lens formation area 112 and the area other than this area 112 are planar surfaces parallel to each other. As illustrated in FIGS. 1 and 2, a plurality of first lens surfaces 111 are disposed in a predetermined direction (vertical direction to the sheet of FIG. 1, left-right direction in FIG. 2) in such a manner as to face a plurality of light emitting elements 32, respectively. In addition, the respective first lens surfaces 111 are formed at the same pitches as those of light emitting elements 32. Further, central axis OA (1) (see FIG. 1) of each first lens surface 111 preferably coincides with the optical axis of laser light L (see FIG. 5A) irradiated from each light emitting element 32 that corresponds to each first lens surface 111.

(Configuration of Reflection Surface)

Figure 5A:
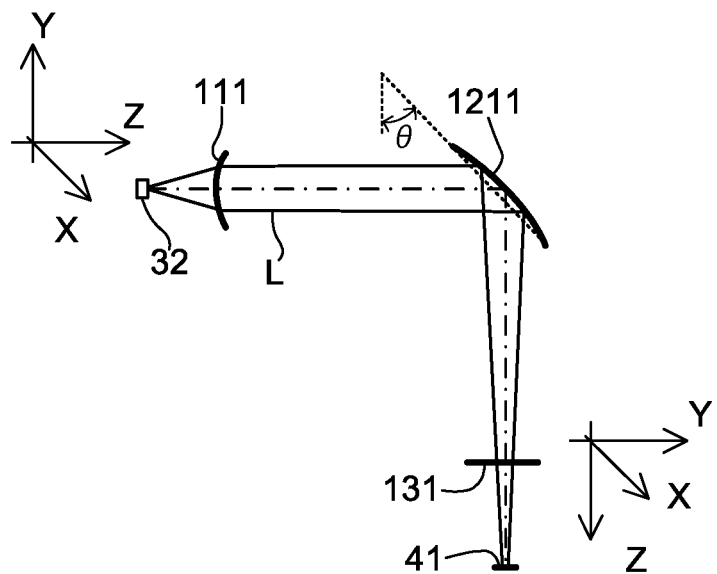
FIGS. 5A to 5C are schematic diagrams of the lens array.

As illustrated in FIGS. 1 and 4, total reflection surface 1211 is a reflection surface having a predetermined curvature. Total reflection surface 1211 is disposed on rear end surface 12 (second surface) of lens array 1. Total reflection surface 1211 is an inner bottom surface of wedge-shaped recess 121 formed in rear end surface 12. In addition, the upper end portion of total reflection surface 1211 is positioned closer to optoelectric converting device 3 than the lower end portion thereof. It is noted that, as illustrated in FIG. 5A, inclining angle θ of total reflection surface 1211 relative to front end surface 11 (smaller one of angles between front end surface 11 and a straight line connecting the upper end portion and the lower end portion of total reflection surface 1211; inclining angle θ) may be 45°.

(Configuration of Emission Surface)

Second lens surface 131 (emission surface) has a predetermined curvature, and is disposed on lower end surface 13 (third surface) to which optical fiber 4 is to be attached. In the present embodiment, the number of first lens surfaces 111 is twelve which is the same number as that of light emitting elements 32. It is noted that, as illustrated in FIGS. 1 and 3, area 132, on which each second lens surface 131 is formed, (hereinafter, referred to as second lens formation area) of lower end surface 13 is a recessed inner surface formed closer to total reflection surface 1211 than an area, outside second lens formation area 132, of lower end surface 13. In addition, second lens formation area 132 and the area outside this area 132 are planar surfaces parallel to each other. Lower end surface 13 is adjacent to front end surface 11 in a direction orthogonal to the direction in which first lens surfaces 111 are disposed.

As illustrated in FIG. 1, a plurality of second lens surfaces 131 are disposed in the vertical direction to the sheet of FIG. 1 (lateral direction in FIG. 3) in a manner to correspond to end surfaces 41 of a plurality of optical fibers 4. The direction in which second lens surfaces 131 are disposed is the same as the direction in which first lens surfaces 111 are disposed. Second lens surfaces 131 are formed at the same pitches as those of first lens surfaces 111. The positions of second lens surfaces 131 are the same as those of optically corresponding first lens surfaces 111 in the disposing direction. It is noted that central axis OA (2) (see FIG. 1) of each second lens surface 131 preferably coincides with the central axis of end surface 41 of each optical fiber 4 that corresponds to each second lens surface 131.

As illustrated in FIG. 5A, laser light L emitted from each of light emitting elements 32 enters through each of first lens surfaces 111. At that time, laser light L is converged depending on the power (refraction power) of lens surface 111 to propagate toward the inside of lens array 1. Incident laser light L reaches total reflection surface 1211 at an incident angle larger than the critical angle. In addition, laser light L having reached total reflection surface 1211 is totally reflected toward optical fiber 4 (downward). The light having been totally reflected at total reflection surface 1211 reaches second lens surfaces 131. Each of the light having reached second lens surfaces 131 is emitted toward end surfaces 41 of each of the corresponding optical fibers 4. Thus, each light emitting element 32 is optically coupled to end surface 41 of each optical fiber 4 via each first lens surface 111, total reflection surface 1211 and each second lens surface 131.

(Curvature Adjustment of Incidence Surface, Reflection Surface and Emission Surface)

In the present embodiment, the curvatures of first lens surface 111, total reflection surface 1211 and second lens surface 131 are adjusted in the same optical surface and between different optical surfaces in order that the X direction tolerance is greater than the Y direction tolerance.

Here, when a plurality of first lens surfaces 111 are disposed in a row in the present embodiment, "X direction" is defined as the alignment direction of this single row (see FIGS. 2 and 3).

In the present embodiment, the traveling direction of laser light L, in lens array 1, from each light emitting element 32 is defined as "Z direction." It is noted that, as illustrated in FIG. 5A, in the present embodiment, lens array 1 is configured to allow the optical path to be bent at total reflection surface 1211, and thus the Z direction at front end surface 11 and the Z direction at lower end surface 13 are different from each other (orthogonal to each other).

"Y direction" is defined as a direction orthogonal to the X and Z directions (see FIG. 2, and FIGS. 5A, 5B and 5C).

On the supposition that a plurality of light emitting elements 32 (in other words, optoelectric converting device 3) are moved along the X direction from a position at which each optical coupling efficiency between the plurality of light emitting elements 32 and end surfaces 41 of a plurality of optical fibers 4 demonstrates a preset maximum efficiency to a position at which a predetermined decrease in optical coupling efficiency based on the maximum efficiency is demonstrated, the "X direction tolerance" is defined as a distance in the X direction between the position of light emitting elements 32 before the movement and the position of light emitting elements 32 after the movement.

On the supposition that a plurality of light emitting elements 32 (in other words, optoelectric converting device 3) are moved along the Y direction from a position at which each optical coupling efficiency between the plurality of light emitting elements 32 and end surfaces 41 of a plurality of optical fibers 4 demonstrates the above-mentioned maximum efficiency to a position at which a predetermined decrease in optical coupling efficiency based on the maximum efficiency is demonstrated, "Y direction tolerance" is defined as a distance in the Y direction between the position of light emitting elements 32 before the movement and the position of light emitting elements 32 after the movement.

Figure 6:
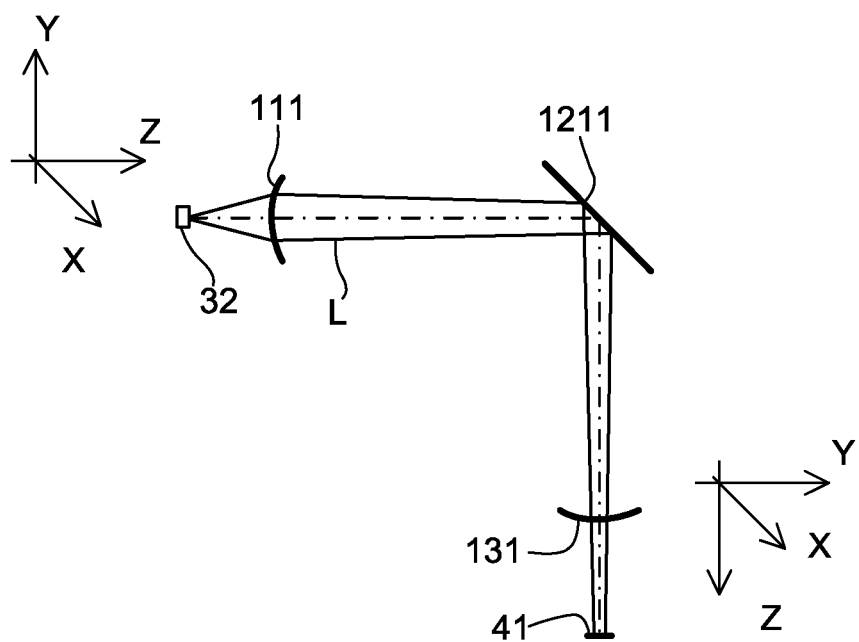
FIG. 6 is a schematic diagram illustrating a configuration of a conventional lens array.

As illustrated in FIG. 6, the "Y direction tolerance" has an equivalent value to a tolerance in a case of supposing that a plurality of first lens surfaces 111 are such aspherical surfaces being convex toward light emitting element 32 as to have the same curvatures in the X and Y directions, supposing that a plurality of second lens surfaces 131 are such aspherical surfaces being convex toward end surface 41 of optical fiber 4 as to have the same curvatures in the X and Y directions, and supposing that total reflection surface 1211 is a planar surface. It can be said that this value is a tolerance of the conventional lens array including a reflection surface.

Accordingly, the curvatures are adjusted in order that the X direction tolerance is positively made to be greater than such a conventional tolerance.

It is noted that the predetermined amount of decrease in optical coupling efficiency that constitutes a reference of tolerance may be 18% based on the maximum efficiency (−1 dB).

As a result of such a curvature adjustment, in the present embodiment, each first lens surface 111 is such biconic surface being convex toward light emitting element 32 as to have different curvatures in the X and Y directions.

Figure 5B:
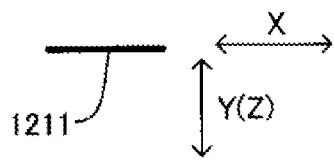

As illustrated in FIGS. 5A and 5B, in the present embodiment, total reflection surface 1211 is a cylindrical surface being concave with respect to light emitting element 32 and end surface 41 of optical fiber 4. Total reflection surface 1211 has a curvature in YZ cross-section (in other words, has a curved shape). In addition, total reflection surface 1211 does not have a curvature in XY and XZ cross-sections (in other words, has a linear shape).

Figure 5C:
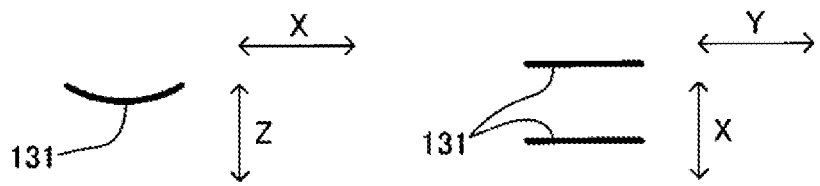

As illustrated in FIGS. 5A and 5C, in the present embodiment, each second lens surface 131 is a cylindrical surface being convex toward end surface 41 of optical fiber 4. Each second lens surface 131 has a curvature in XZ cross-section, but does not have a curvature in XY and YZ cross-sections.

(Other Configurations)

As illustrated in FIG. 2, planar circular-shaped hole parts 113 are respectively formed at both positions, in the direction in which first lens surfaces 111 are disposed (i.e., X direction in the present embodiment), outside of first lens formation area 112. These hole parts 113 are used for mechanical positioning of optoelectric converting device 3 when fixing optoelectric converting device 3 to lens array 1 by fitting hole parts 113 to pins (illustration omitted) formed at semiconductor substrate 31 side.

As illustrated in FIGS. 1 and 3, planar circular-shaped pins 133 are erected at both positions, in the direction in which second lens surfaces 131 are disposed (i.e., X direction in the present embodiment), outside of second lens formation area 132. Pins 133 are used for mechanical positioning of optical fiber 4 to lens array 1 by inserting pins 133 into hole parts (not illustrated) formed in optical fiber 4 on connector 42 side.

(Operation and Effect)

As described above, according to the present embodiment, first lens surface 111 is set as a biconic surface, total reflection surface 1211 as a cylindrical mirror surface having a principal power in YZ-cross section, and second lens surface 131 as a cylindrical surface having a principal power in XZ-cross section. Thus, it becomes possible to make the tolerance in the X direction in which the optical coupling efficiency tends to be influenced by thermal deformation can be greater than the tolerance in the Y direction, and to positively enhance the X direction tolerance compared with the conventional tolerance. In addition, the positional precision required for light emitting element 32 can be eased.

As a result, lens array 1 according to Embodiment 1 can effectively ease the temperature dependency of the optical coupling efficiency while enhancing manufacturing efficiency and freedom of design.

When, in the conventional lens array as illustrated in FIG. 6, the X direction tolerance is set as ΔX and the Y direction tolerance as ΔY, and when, in lens array 1 according to the present embodiment, the X direction tolerance is set as ΔX' and the Y direction tolerance as ΔY', the following equation (1) holds true between these parameters:

$$\Delta X' > \Delta Y' = \Delta Y = \Delta X \quad (1)$$

In addition, when the positional variation of first lens surface 111 due to thermal deformation (expansion or shrinkage) of lens array 1 is set as ΔL, ΔL can be expressed as equation (2):

$$\Delta L = \alpha \times \Delta T \times L \quad (2)$$

Figure 7:
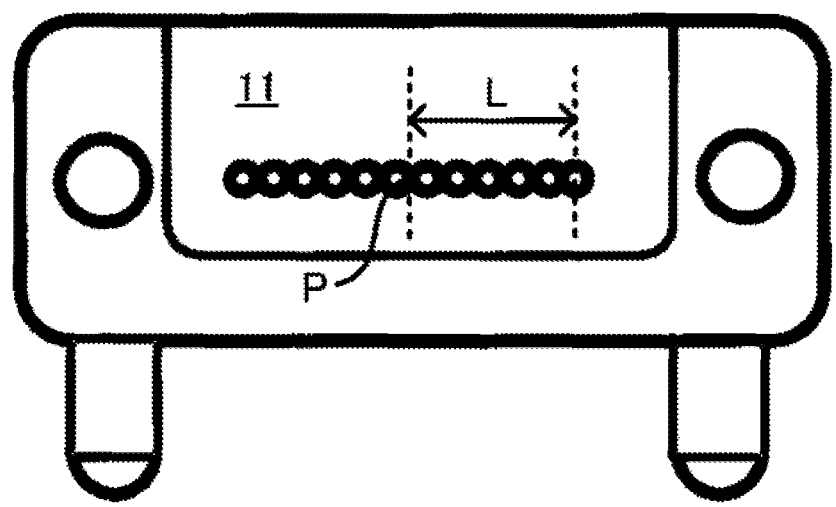
FIG. 7 is an explanatory drawing of effects of Embodiment 1.

However, in equation (2), α is a linear expansion coefficient of a resin material forming lens array 1, and ΔT is a difference in temperature (e.g., difference between temperature of lens array 1 and ordinary temperature). L is a distance in the X direction between a predetermined reference point of thermal deformation (center point of deformation) on front end surface 11 of lens array 1 and a center point of first lens surface 111 which is the most distant from the reference point. It is noted that, as illustrated in FIG. 7, reference point P of thermal deformation defined as L often constitutes a center point of front end surface 11. However, the present embodiment can cope with reference points at various positions required in advance according to simulations, or the like, other than such a mode.

Further, from the above-described meanings of the tolerances, equation (3) holds true between ΔX' and ΔL:

$$\Delta X' > \Delta L = \alpha \cdot \Delta T \cdot L \quad (3)$$

When equation (3) is solved for ΔT, equation (4) is given:

$$\Delta T < \Delta X'/(\alpha \cdot L) \quad (4)$$

Here, since ΔX' in equation (4) is greater than ΔX of the conventional lens array, the left-hand side value ΔT can also be greater than that of the conventional lens array.

That is, according to the present embodiment, it is possible to widen an available temperature range more than before. It is noted that, according to the present embodiment, even when the temperature change of lens array 1 is smaller or zero, the tolerance can be wider, making it possible to use lens array 1 without requiring strict positional precision between the device (such as VCSEL) and the fiber.

On the other hand, when equation (3) is solved for L, equation (5) is given:

$$L < \Delta X'/(\alpha \cdot \Delta T) \quad (5)$$

Here, in the same manner as equation (4), since ΔX' in equation (5) is greater than ΔX of the conventional lens array, the left-hand side value L can also be greater than that of the conventional lens array.

That is, according to the present embodiment, it is possible to increase the number of channels (number of light emitting element 32, lens surfaces 111 and 131, and optical fiber 4) more than before.

(Simulation)

The respective parameters of lens array 1 according to Embodiment 1 were set as indicated in Table 1. In Table 1, R denotes a curvature radius of an optical surface, Rx denotes a curvature radius (mm) in the X direction, and Ry denotes a curvature radius (mm) in the Y direction. In addition, in Table 1, D denotes a distance (mm) to the next optical surface. n denotes refractive index of lens array 1 corresponding to an operating wavelength of 850 nm (resin material). K is a conic coefficient of an optical surface, Kx is a conic coefficient in the X direction, and Ky is a conic coefficient in the Y direction.

TABLE 1

| Optical Surface | R | | D | n | K | |
|---|---|---|---|---|---|---|
| Substrate (Device) Surface | 0 | | 0.25 | — | — | |
| Incidence Surface (Bionic Surface) | Rx 0.11 | Ry 0.17 | 1.0 | 1.64 | Kx −1.58 | Ky −2.89 |
| Reflection Surface (Cylinder Mirror Surface) | Rx 0 | Ry −3.58 | 0.9 | — | Kx 0 | Ky 0 |
| Emission Surface (Cylinder Surface) | Rx 0.14 | Ry 0 | 0.35 | — | Kx −2.49 | Ky 0 |
| Fiber End Surface | 0 | | — | — | — | |

In addition, as a comparative example, the respective parameters of the conventional lens array illustrated in FIG. 6 were set as indicated in Table 2. The meanings of the respective parameters in Table 2 are the same as those of the parameters in Table 1.

TABLE 2

| Optical Surface | R | D | n | K |
|---|---|---|---|---|
| Substrate (Device) Surface | 0 | 0.25 | — | — |
| Incidence Surface (Aspherical Surface) | 0.14 | 1.0 | 1.64 | −2.26 |
| Reflection Surface (Planar Surface) | 0 | 0.9 | — | 0 |
| Emission Surface (Aspherical Surface) | 0.32 | 0.35 | — | 0.86 |
| Fiber End Surface | 0 | — | — | — |

Figure 8:
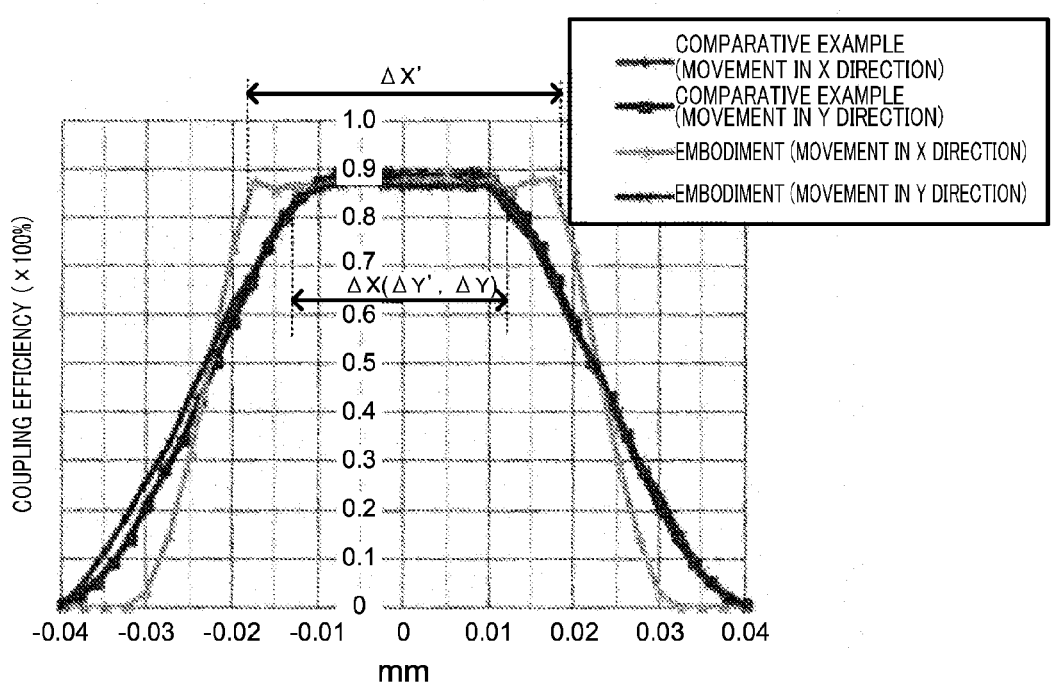
FIG. 8 illustrates simulation results of tolerances using the lens array according to Embodiment 1.

The lens arrays of Embodiment 1 and the comparative example in which each parameter was set at a predetermined value were used to simulate tolerances. FIG. 8 illustrates simulation results of tolerances using the lens arrays according of Embodiment 1 and for comparison. The abscissa in FIG. 8 indicates the moving distance of light emitting element 32. In addition, the ordinate indicates optical coupling efficiency. FIG. 8 illustrates the change in optical coupling efficiency in a case where light emitting element 32 is moved from a position at which the maximum efficiency of optical coupling efficiency is demonstrated along the X and Y directions with respect to the respective lens arrays of Embodiment 1 and the comparative example. Each tolerance in the X and Y directions can be determined based on the characteristics of such change in optical coupling efficiency.

As illustrated in FIG. 8, the tolerance ΔX' in the X direction of lens array 1 of Embodiment 1 was 1.5 times or more longer than the tolerance ΔX in the X direction of the lens array of the comparative example. In addition, the tolerance ΔX' in the X direction was 1.5 times or more (i.e., 1.2 times or more) longer than the tolerance ΔY' in the Y direction. In Embodiment 1, the amount of movement of light emitting element 32 until the time when a decrease in optical coupling efficiency of only 5% based on the maximum efficiency is found is set as a tolerance. However, even when the reference for the tolerance was set strictly (to be smaller) in terms of optical performance, it was found that significant enhancement in tolerance was demonstrated.

Embodiment 2

Next, the lens array according to Embodiment 2 of the present invention will be described with reference to FIG. 9, mainly on the difference from the lens array of Embodiment 1.

The difference between lens array 1 of Embodiment 1 and the lens array of Embodiment 2 lies in the mode of curvature adjustment of first lens surface 111. Specifically, in the lens array of Embodiment 2, the curvatures of first lens surface 111 in the X and Y directions are the same. In addition, first lens surface 111 is an aspherical surface being convex toward light emitting element 32.

In the lens array of Embodiment 2, the X direction tolerance can be made to be greater than the Y direction tolerance in the same manner as in Embodiment 1, enabling the positional precision required for light emitting element 32 to be eased.

(Simulation)

The respective parameters of lens array 1 according to Embodiment 2 were set as indicated in Table 3. The parameters in Table 3 are the same as those in Table 1. In addition, the conventional lens array used as the comparative example is the same as that in Embodiment 1.

TABLE 3

| Optical Surface | R | | D | n | K | |
|---|---|---|---|---|---|---|
| Substrate (Device) Surface | 0 | | 0.25 | — | — | |
| Incidence Surface | 0.17 | | 1.0 | 1.64 | −2.89 | |
| Reflection Surface (Cylinder Mirror Surface) | Rx 0 | Ry −3.62 | 0.9 | — | Kx 0 | Ky 0 |
| Emission Surface (Cylinder Surface) | Rx 0.21 | Ry 0 | 0.35 | — | Kx −2.49 | Ky 0 |
| Fiber End Surface | 0 | | — | — | — | |

The lens arrays of Embodiment 2 and the comparative example in which each parameter was set at a predetermined value were used to simulate tolerances. Simulation results are illustrated in FIG. 9. The abscissa in FIG. 9 indicates the moving distance of light emitting element 32. In addition, the ordinate indicates optical coupling efficiency.

Figure 9:
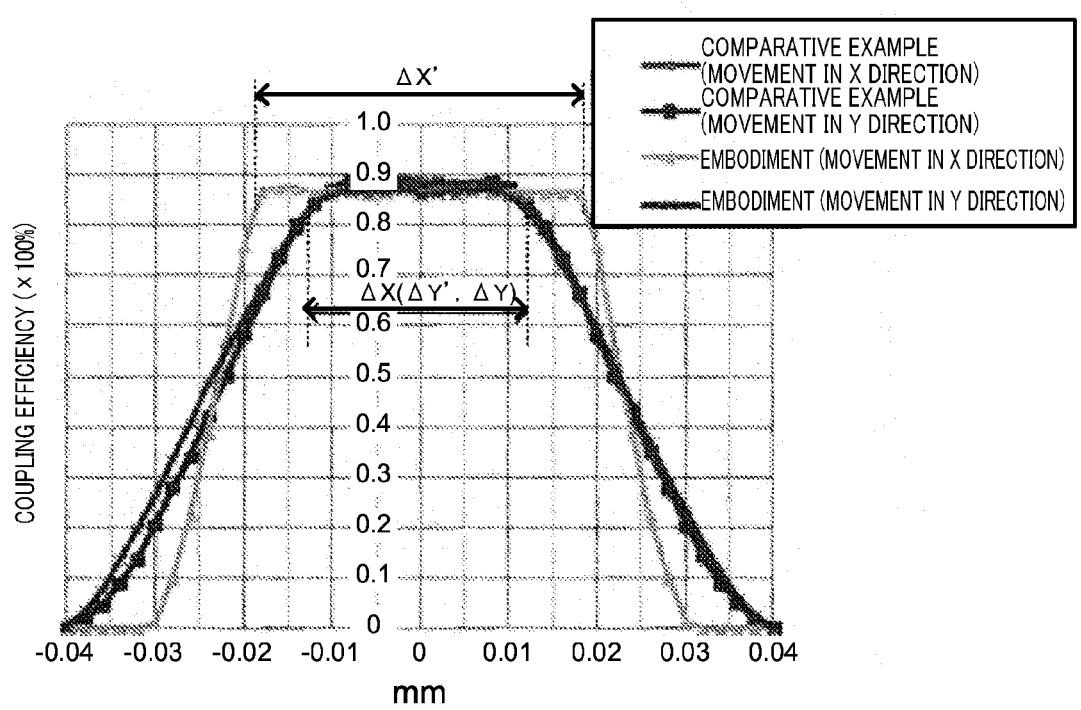
FIG. 9 illustrates simulation results of tolerances using a lens array according to Embodiment 2.

As illustrated in FIG. 9, also in the present embodiment, the tolerance ΔX' in the X direction of lens array 1 of Embodiment 2 was 1.5 times or more longer than the tolerance ΔX in the X direction of the lens array of the comparative example. In addition, the tolerance ΔX' in the X direction was 1.5 times or more longer than the tolerance ΔY' in the Y direction. Also in Embodiment 2, the amount of movement of light emitting element 32 until the time when a decrease in optical coupling efficiency of only 5% based on the maximum efficiency is found is set as a tolerance. However, even when the reference for the tolerance was set strictly (to be smaller) in terms of optical performance, it was found that significant enhancement in tolerance was demonstrated.

Embodiment 3

Next, lens array 1 according to Embodiment 3 of the present invention will be described with reference to FIGS. 10 to 15, mainly on the difference from lens array 1 according to Embodiment 1.

Figure 10:
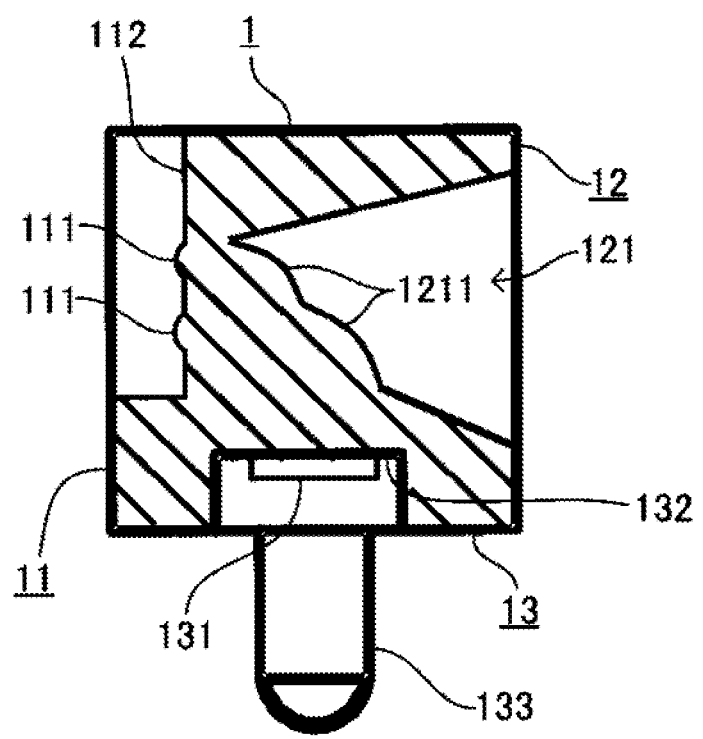
FIG. 10 is a sectional view of a lens array according to Embodiment 3.
Figure 11:
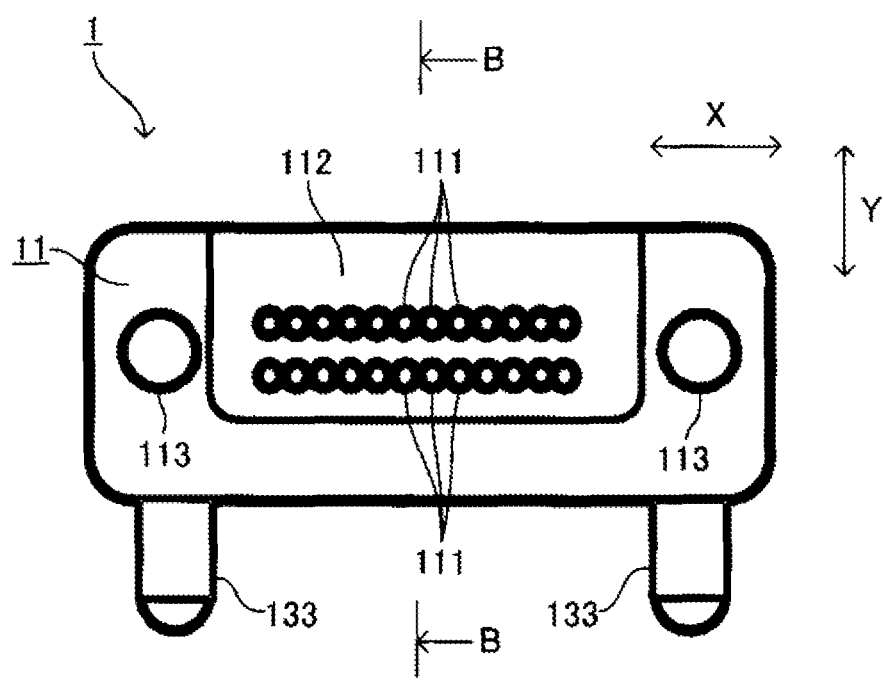
FIG. 11 is a front view of the lens array.
Figure 12:
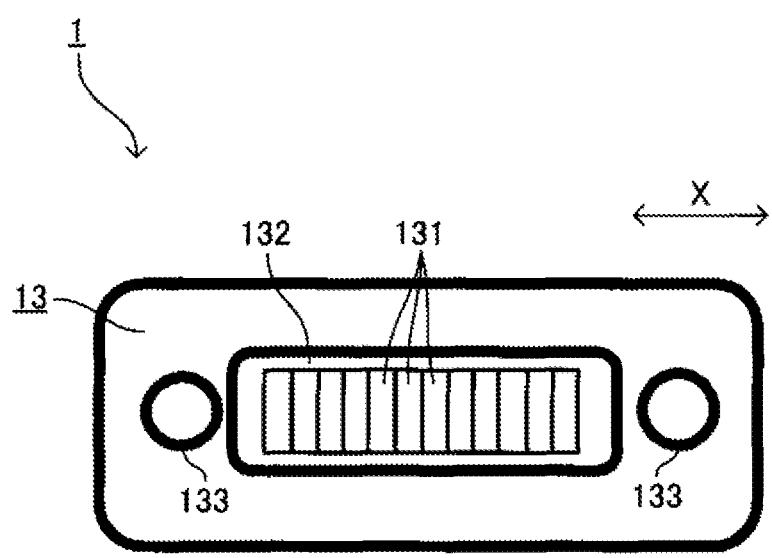
FIG. 12 is a bottom view of the lens array.
Figure 13:
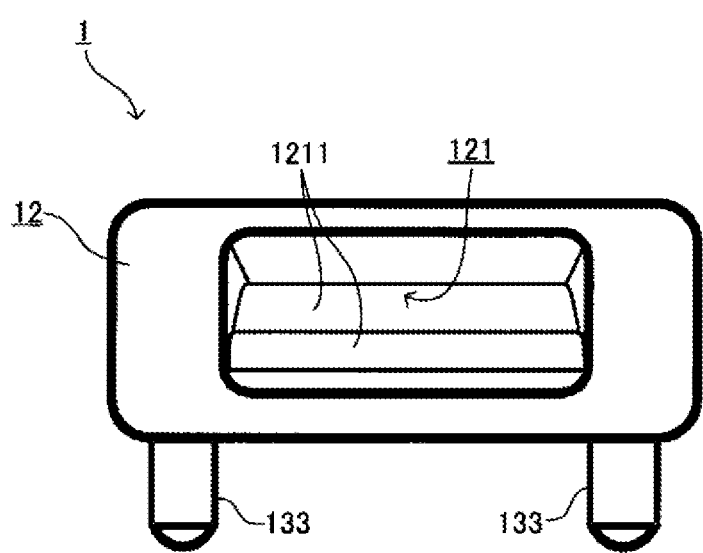
FIG. 13 is a rear view of the lens array.
Figure 14:
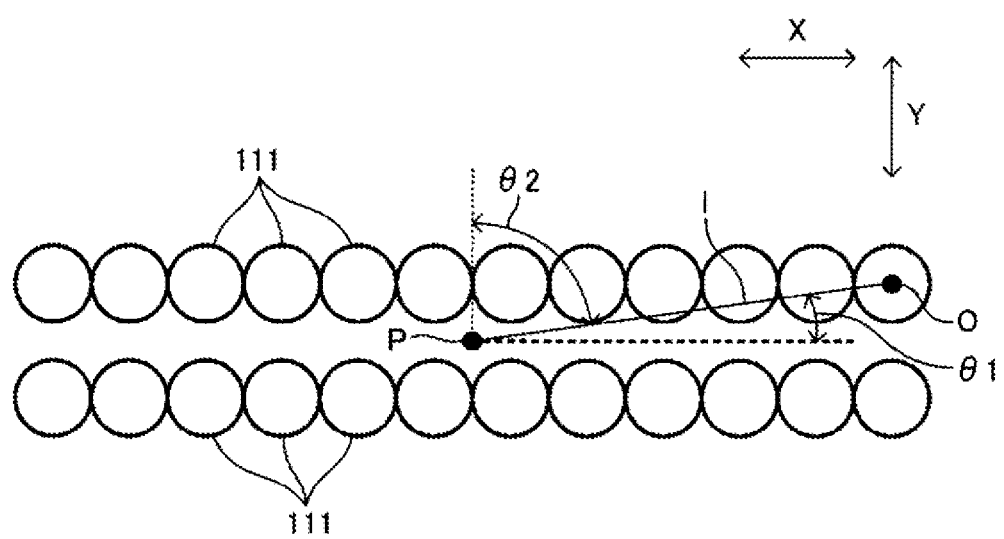
FIG. 14 is an explanatory diagram of X direction in Embodiment 3.
Figure 15:
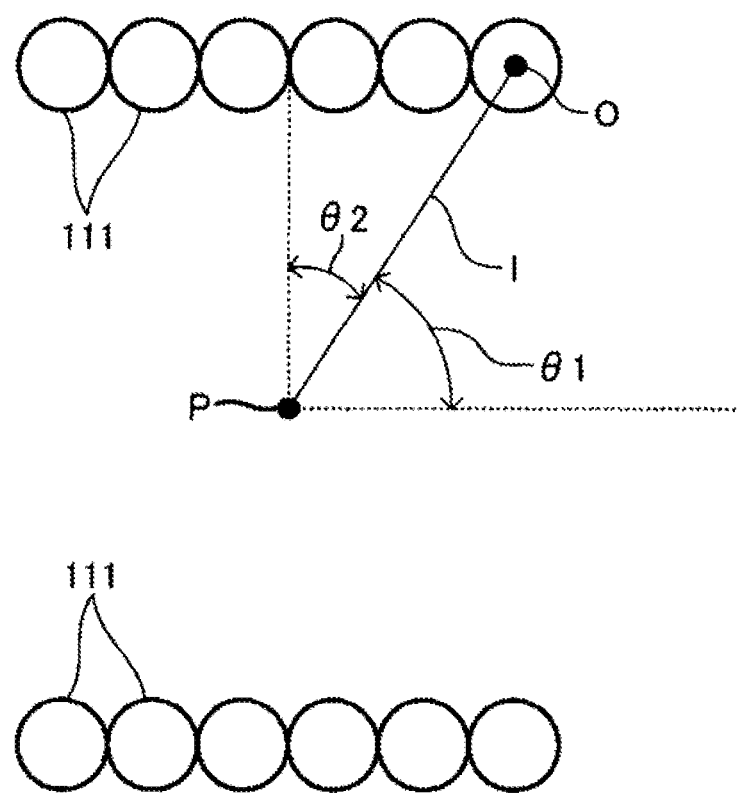
FIG. 15 is a schematic diagram illustrating a modification of Embodiment 3.

FIG. 10 is a longitudinal sectional view (sectional view taken along line B-B in FIG. 11) of lens array 1 in the present embodiment. FIG. 11 is a front view of lens array 1 illustrated in FIG. 10. FIG. 12 is a bottom view of lens array 1 illustrated in FIG. 10. FIG. 13 is a rear view of lens array 1 illustrated in FIG. 10. FIG. 14 is an explanatory diagram of X direction in Embodiment 3. FIG. 15 is a schematic diagram illustrating a modification in Embodiment 3.

As illustrated in FIG. 11, first lens surfaces 111 of lens array 1 according to Embodiment 3 are disposed in two rows in parallel. In addition, second lens surface 131 is a cylinder surface having a size corresponding to each of first lens surfaces 111 in each row. Further, total reflection surface 1211 is a cylinder mirror surface having two types of curvatures, corresponding to each of first lens surfaces 111 in each row. While not illustrated in particular, light emitting elements 32 and optical fibers 4 are disposed in two rows so as to correspond to the configuration of lens array 1.

In Embodiment 1, the number of the unit row in which a plurality of first lens surfaces 111 are oriented is one, and thus the direction in which the lens row is disposed is defined as the X direction, as a direction in which the optical coupling efficiency tends to be influenced the most by thermal deformation.

In contrast, in Embodiment 3, when a plurality of (two, in FIG. 14) unit rows in which a plurality of (e.g., three) first lens surfaces 111 are oriented are disposed in parallel along the parallel direction (longitudinal direction in FIG. 14) orthogonal to the orientation direction of the unit row (lateral direction in FIG. 14), "X direction" was defined as follows.

In Embodiment 3, a direction having a relatively smaller angle, out of the orientation direction and the parallel direction, relative to virtual straight line 1 connecting reference point P of thermal deformation on front end surface 11 of lens array 1 and center point O of first lens surface 111 that is the most distant from the reference point P, was defined as the "X direction."

Specifically, in FIG. 14, an angle between the alignment (lateral) direction and virtual straight line 1 is θ1, and an angle between the parallel (longitudinal) direction and virtual straight line 1 is θ2. Out of these angles, θ1 is smaller.

Accordingly, in Embodiment 3, the lateral direction in FIG. 14 was defined as the X direction, and the longitudinal direction as the Y direction. Under this precondition, in the same manner as Embodiment 1, the curvature of each of the optical surfaces 111, 1211 and 131 were adjusted as described above, in order that the X direction tolerance is greater than the Y direction tolerance.

As described above, even in a case where unit rows each having a plurality of first lens surfaces 111 are disposed in parallel, a direction in which thermal deformation tends to have an influence the most is defined as X direction. Also in this case, the X direction tolerance can be made to be greater than the Y direction tolerance, and thus it becomes possible to flexibly cope with various modes in which light emitting elements 32 are disposed.

It is noted that, also in a configuration in which lens surfaces 111 are disposed in two rows as in the same manner as in FIG. 14, when angle θ2 between the parallel (longitudinal) direction and virtual straight line 1 is the smallest as illustrated in FIG. 15, the parallel direction is the X direction, and the alignment (lateral) direction is the Y direction.

The present invention is not limited to the above-described embodiments, and can be implemented with various modifications insofar as they are within the scope of the appended claims or the equivalents thereof.

For example, in a case where first lens surfaces 111 are aligned and disposed so as to form a plurality of rows when seen along any of a plurality of directions in such a manner, for example, as a grid shape, a direction, among the plurality of directions, in which the number of first lens surfaces 111 being aligned is the largest may be set as the alignment direction, and a direction orthogonal to this direction as the parallel direction, before determining the "X direction."

Figure 16:
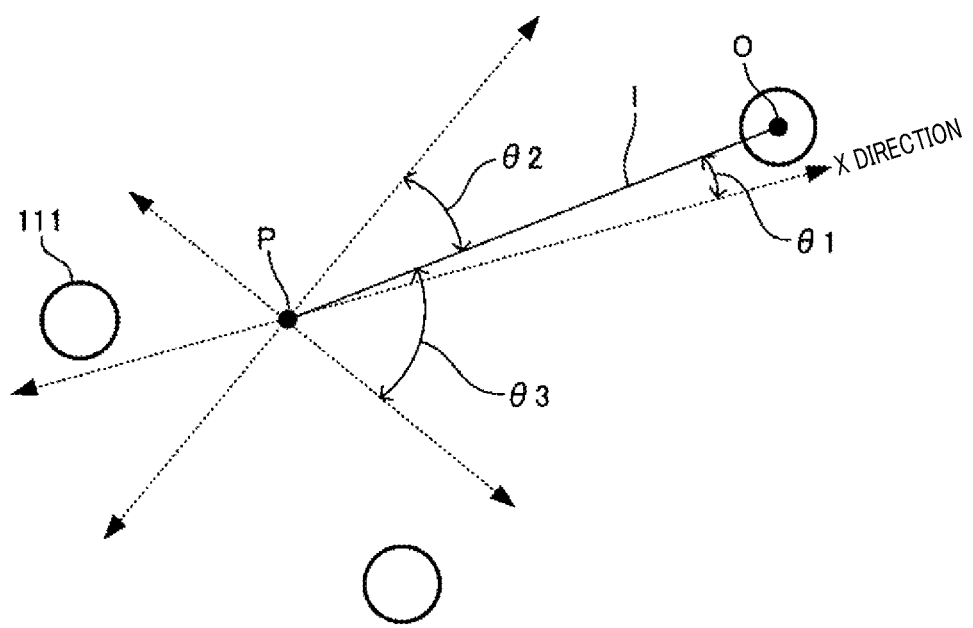
FIG. 16 is a schematic diagram illustrating another modification of Embodiment 3.

As illustrated in FIG. 16, when the number of first lens surfaces 111 being aligned is small, so that a unit row in which a predetermined number (e.g., three) or more of first lens surfaces 111 are aligned cannot be envisaged, a line segment direction, among line segment directions connecting center points of the respective first lens surfaces 111 (broken line in FIG. 16), of which angle relative to line segment 1 connecting reference point P of thermal deformation and center point O of first lens surface 111 that is the most distant from this reference point P is the smallest (θ1 in FIG. 16) may be defined as "X direction."

The present application is entitled to and claims the benefit of Japanese Patent Application No. 2012-225197 filed on Oct. 10, 2012, the disclosure each of which including the specification, drawings and abstract is incorporated herein by reference in its entirety.

INDUSTRIAL APPLICABILITY

The optical coupling element and the optical module according to the present invention are useful for optical communications using optical fibers, for example.

REFERENCE SIGNS LIST

1 Lens array
11 Front end surface
111 First lens surface
12 Rear end surface
1211 Total reflection surface
13 Lower end surface
131 Second lens surface
32 Light emitting element
4 Optical fiber
41 End surface

The invention claimed is:

1. An optical coupling element configured to be able to optically couple a plurality of light emitting elements and end surfaces of a plurality of optical fibers in such a state as to be disposed between the plurality of light emitting elements and the plurality of optical fibers, the optical coupling element comprising:
　a plurality of incidence surfaces having a curvature disposed to correspond to each of the plurality of light emitting elements, on a first surface closer to the plurality of light emitting elements, of a optical coupling element main body and allowing each light emitted from the plurality of light emitting elements to enter the plurality of incidence surfaces;
　a reflection surface having a curvature disposed to have an inclination relative to the first surface, on a second surface opposite to the first surface, of the optical coupling element main body and reflecting each light from the plurality of light emitting elements having entered the plurality of incidence surfaces toward the plurality of optical fibers; and
　a plurality of emission surfaces having a curvature disposed to correspond to each of the end surfaces of the plurality of optical fibers, on a third surface, closer to the plurality of optical fibers, of the optical coupling element main body and emitting each light from the plurality of light emitting elements having been reflected by the reflection surface toward the end surfaces of the plurality of optical fibers, wherein:
　in a case where, when the plurality of incidence surfaces are aligned and disposed to form only a single row in an alignment direction of the single row, the alignment direction is defined as "X direction,"
　a traveling direction of the light emitted from the plurality of light emitting elements is defined as "Z direction," and
　a direction orthogonal to the X and Z directions is defined as "Y direction," and
　on a supposition that the plurality of light emitting elements are moved from a position at which each optical coupling efficiency between the plurality of light emitting elements and the end surfaces of the plurality of optical fibers demonstrates a preset maximum efficiency to a position at which a predetermined decrease in optical coupling efficiency based on the maximum efficiency is demonstrated, a distance in the X direction between the position before the movement and the position after the movement is defined as "X direction tolerance," and
　a distance in the Y direction between the position before the movement and the position after the movement is defined as "Y direction tolerance,"
　curvatures of the incidence surface, the reflection surface, and the emission surface are adjusted such that the X direction tolerance is greater than the Y direction tolerance.

2. The optical coupling element according to claim 1, wherein, when the plurality of incidence surfaces are disposed in such a state that a plurality of unit rows, in which a predetermined number or more of the incidence surfaces are aligned, are arranged in parallel along a parallel direction orthogonal to an alignment direction of the unit row, a direction having a relatively smaller angle, out of the alignment direction and the parallel direction, relative to a virtual straight line connecting a predetermined reference point of thermal deformation on the first surface of the optical coupling element main body and a center point of the incidence surface that is the most distant from the reference point, is defined as "X direction".

3. The optical coupling element according to claim 1, wherein:
　the plurality of incidence surfaces are such biconic surfaces being convex toward the light emitting elements as to have different curvatures in the X and Y directions;
　the reflection surface is such a cylindrical surface being concave with respect to the light emitting elements and the end surfaces of the optical fibers as to have a curvature in YZ cross-section but not to have a curvature in XY and XZ cross-sections; and
　the plurality of emission surfaces are such cylindrical surfaces being convex toward the end surfaces of the optical fibers as to have a curvature in XZ cross-section but not to have a curvature in XY and YZ cross-sections.

4. The optical coupling element according to claim 1, wherein:
　the plurality of incidence surfaces are such aspherical surfaces being convex toward the light emitting elements as to have the same curvatures in the X and Y directions;
　the reflection surface is such a cylindrical surface being concave with respect to the light emitting elements and the end surfaces of the optical fibers as to have a curvature in YZ cross-section but not to have a curvature in XY and XZ cross-sections; and
　the plurality of emission surfaces are such cylindrical surfaces being convex toward the end surfaces of the optical fibers as to have a curvature in XZ cross-section but not to have a curvature in XY and YZ cross-sections.

5. The optical coupling element according to claim 1, wherein
　the Y direction tolerance has an equivalent value to a tolerance in a case of supposing that the plurality of incidence surfaces are such aspherical surfaces being convex toward the light emitting elements as to have the same curvatures in the X and Y directions,
　supposing that the plurality of emission surfaces are such aspherical surfaces being convex toward the end surfaces of the optical fibers as to have the same curvatures in the X and Y directions, and
　supposing that the reflection surface is a planar surface; and
　the curvatures are adjusted in order that the X direction tolerance is greater than the equivalent value of the Y direction tolerance.

6. The optical coupling element according to claim 1, wherein the curvatures are adjusted in order that the X direction tolerance is 1.2 times or more greater than the Y direction tolerance.

7. The optical coupling element according to claim 1, wherein the reflection surface is a total reflection surface that totally reflects each light from the plurality of light emitting elements toward the plurality of emission surfaces.

8. An optical module comprising:
   the optical coupling element according to claim 1; and
   a light emitting element.

* * * * *